United States Patent [19]

Dey

[11] Patent Number: 5,150,256

[45] Date of Patent: Sep. 22, 1992

[54] OPTICAL RETICLE PROJECTOR

[75] Inventor: Thomas W. Dey, Springwater, N.Y.

[73] Assignee: Eastman Kodak Company, Rochester, N.Y.

[21] Appl. No.: 607,191

[22] Filed: Oct. 31, 1990

[51] Int. Cl.$^5$ .............................................. G02B 23/00
[52] U.S. Cl. .................................... 359/428; 359/900
[58] Field of Search ............... 350/537, 538, 566, 576; 356/251–252; 250/203.1–203.7, 202; 359/399–400, 428–505

[56] References Cited

U.S. PATENT DOCUMENTS

| | | | |
|---|---|---|---|
| 3,994,597 | 11/1976 | Calder et al. | 356/251 |
| 4,199,220 | 4/1980 | Casagrande | 350/576 |
| 4,199,257 | 4/1980 | Dosch et al. | 356/252 |
| 4,417,814 | 11/1983 | Doliber | 356/252 |
| 4,658,139 | 4/1987 | Bennan et al. | 356/251 |
| 5,107,370 | 4/1992 | Dey | 359/428 |

OTHER PUBLICATIONS

Stong, "A Refracting Telescope in which the Main Lens Consists of Only One Piece of Glass", Scientific American, vol. 198, No. 5, May 1958, pp. 130–132, 134, 136, 138.

Primary Examiner—Bruce Y. Arnold
Assistant Examiner—James Phan
Attorney, Agent, or Firm—Stephen C. Kaufman

[57] ABSTRACT

An optical reticle projector which may be employed for astronomical data collection. The projector consists of a cylindrical housing having a radius from 0.5 to 4.0 inches; a source of radiation secured by the housing, the source of radiation capable of outputting a radiation beam along an optical axis defined with respect to the housing; an optical field element secured by the housing and positioned on the optical axis; a reticle having a predetermined geometry, and in operative association with the field element; and an imaging lens secured by the housing, positioned on the optical axis, and capable of imaging the reticle to infinity.

19 Claims, 6 Drawing Sheets

OPTICAL RETICLE PROJECTOR

FIELD OF THE INVENTION

This invention relates to an optical reticle projector which may be employed for astronomical data collection.

INTRODUCTION TO THE INVENTION

Figure 1:
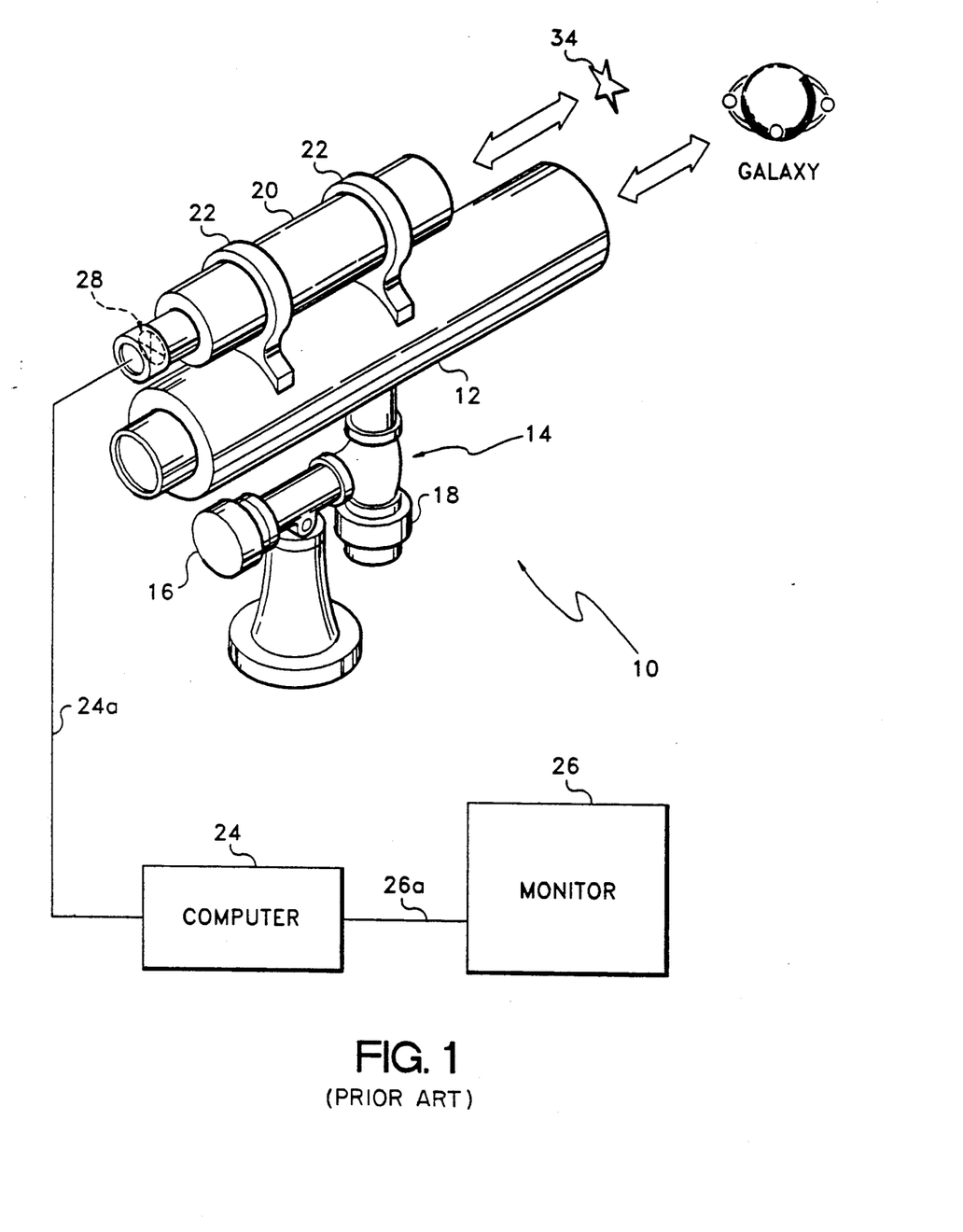
FIG. 1 shows a ground-based optical system that may be employed for astronomical data collection.

FIG. 1 shows a typical and important ground-based optical system 10 that may be employed for astronomical data collection.

A centerpiece of the optical system 10 comprises a main telescope 12. Typically, the main telescope 12 can track a target of interest, for example, a star, a nebula, or a galaxy, as the target moves across the sky due to the earth's rotation. During the tracking, data collection may be effected, and this process frequently extends over a very long time period, for example, from a few minutes to many hours.

The FIG. 1 optical system 10 also includes an equatorial or alti-azimuth gimballed mount 14, and a main motor drive 16, which mount 14-drive 16 can cooperate to continuously position the main telescope 12, as it tracks a target. A secondary motor 18 may also be used for effecting declination.

The FIG. 1 optical system 10, further includes a guide telescope 20, whose operation and functionality will be described below, and which may be connected to the main telescope 12, by interface bracketry 22. Finally, the optical system 10 includes a computer 24 and a camera monitor 26, connected along a set of lines 24a and 26a, respectively, that can cooperate with the guide telescope 20 and computer 24.

SUMMARY OF THE INVENTION

As indicated above, the FIG. 1 optical system 10 may be advantageously employed for tracking a target of interest. At the same time, it is known that a nominal such tracking may not be sufficiently accurate, for a set of reasons including:

(1) inaccuracies in the gimballed mount 14;

(2) inaccuracies in an alignment of the gimballed mount 14 to the earth's rotational axis;

(3) variations from nominal in the motor 16 drive rates; and/or (4) changes in atmospheric refraction.

It is known, further, that the guide telescope 20 may be employed for monitoring the listed set of inaccuracies, for the purpose of compensating for, thereby eliminating, the listed set of inaccuracies.

To this end, the FIG. 1 guide telescope 20 typically includes an internal reticle 28. In operation, the guide telescope 20 may be employed for monitoring the tracking inaccuracies by precisely measuring a centering of a guide star to the internal reticle 28. Then, any drift of the guide star from a center defined by the internal reticle 28, may be interpreted as an indication of tracking inaccuracy. Hence, such as indication of tracking inaccuracy may be periodically compensated for, by using e.g., auxiliary guide connection motors, or by changing the drive rates of the main motor drive 16. In all cases, one causes the guide star to maintain a highly precise centering upon the internal reticle 28.

Figure 2:
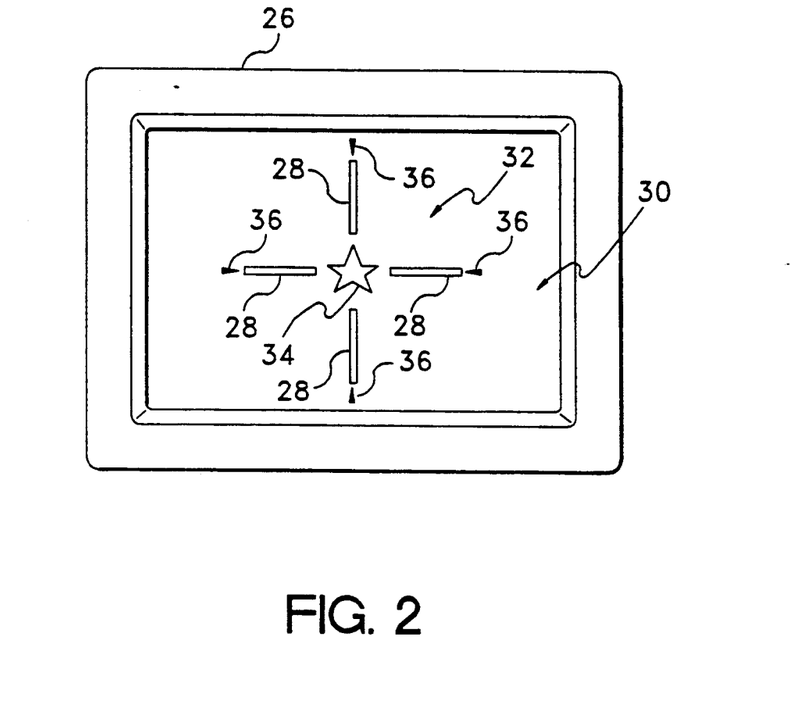
FIG. 2 is a schematic that helps explain a compensation process utilized in the FIG. 1 optical system.

An example of this compensation process may be schematically illustrated by way of FIG. 2. FIG. 2 shows a screen 30 of the guide telescope's 20 camera monitor 26. In particular, the camera monitor 26 provides on the screen 30 a fixed and centered image 32 of the guide telescope's 20 internal reticle 28. Further, an image of a guide star 34 is shown precisely centered upon the imaged internal reticle 32. All these images, moreover, are centered with respect to a set of camera fiducials 36. Now, any drift of the imaged guide star 34 from the imaged internal reticle 32, may be interpreted as an indication of tracking inaccuracy (due, in turn, to the listed set of inaccuracies, supra). Hence, the tracking inaccuracy may be periodically compensated for, by, for example, engaging an auxiliary guide correction motor, so as to drive the imaged guide star 34 back to center, as defined by the imaged internal reticle 32.

An Inherent Problem In The Preceding Compensation Process: Differential Flexure I have now discovered an inherent problem in the preceding compensation process. The problem, differential flexure, is profound and pervasive, and can arise as an intersection of the following two independent fact situations.

The first fact situation may be referenced, generally, as "weight". In particular, the main telescope 12 typically has an aperture diameter of approximately 100.0 cm, and can weigh approximately 1000.0 pounds. The guide telescope 20, on the other hand, nominally has at least 30% of the aperture of the main telescope 12, in order to acquire an acceptably bright image of a guide star. Therefore, for our example of the main telescope 12 having a 100.0 cm aperture diameter, the guide telescope 20 preferably has an aperture diameter of at least 30.0 cm. This specification, in turn, typically results in the guide telescope 20 weighing at least 100.0 pounds. The facts of the absolute and relative weights of the guide telescope 20 to the main telescope 12, are referenced here, and will be developed for their significance as forces, after setting out the second independent fact situation.

The second independent fact situation has been alluded to above, namely, that astronomical data collection frequently extends over a very long time period, for example, up to many hours. During this entire time period, the pointing of the main telescope 12 at a target of interest, should be very accurately maintained. For example, tracking may extend over four hours, and require the main telescope 12 to be swung through a large arc, for example, a 60° arc. A required pointing accuracy for this tracking motion is preferably at least 0.2 arc-second. This last parameter corresponds to a total acceptable guiding error of one part per million.

The first and second fact situations, just outlined, may intersect in the following way, thus defining the differential flexure problem which is the subject of this part of the specification.

Because the mount 14 may swing through a 60° arc (second fact situation), the pull of gravity relative to the main telescope 12 and guide telescope 20, may vary in direction, and by a comparatively large amount, due to the significant weight differentials defined by the main telescope 12 and guide telescope 20, respectively (first fact situation). This action, in turn, may result in a weight-induced differential bending of the guide telescope 20-interface bracketry 22, as shown in FIG. 1. This action, accordingly, may be referenced as differential flexure.

Differential flexure may be a problem because it may vitiate a desired co-alignment of the guide telescope 20 to the main telescope 12, thereby inducing an anomolous de-centration of the imaged guide star 34 to the guide telescope imaged internal reticle 32 (FIG. 2). Further, differential flexure is a silent problem: the magnitude and direction of the anomolous de-centration are generally unknown, and worse, the differential flexure is inexorably, if silently, inseparably mixed with the four errors summarized above as the "listed set of inaccuracies" (e.g., changes in atmospheric refraction).

Figure 3:
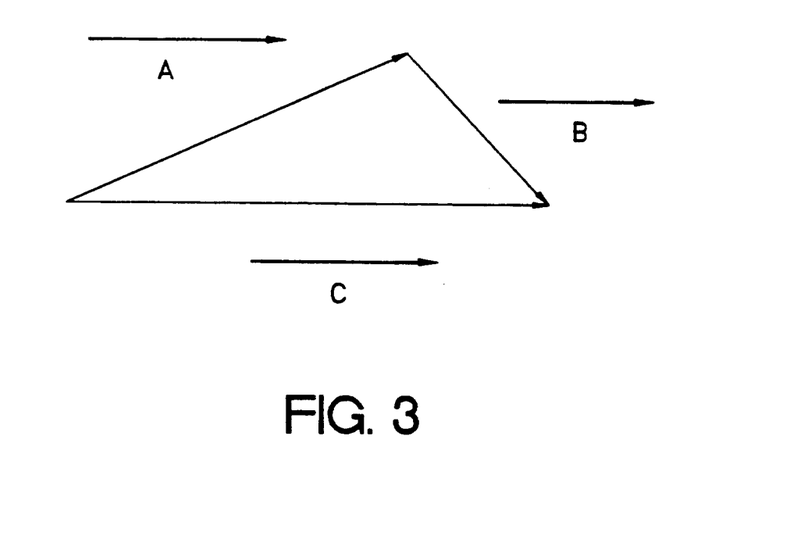
FIG. 3 shows a vector diagram that aids in conceptualizing an inherent problem in the FIG. 1 optical system.

This last point is usefully developed by way of a vector diagram, of the type shown in FIG. 3. FIG. 3 shows a set of three angular displacement vectors A, B, C. The vector A represents true angular displacement errors requiring correction, and consisting of the four errors summarized above, as the "listed set of inaccuracies". The vector B represents an anomolous angular displacement error, due to differential flexure. The vector C, finally, represents a summed total error due to vectors A+B.

Now, because the internal reticle 28 is located as part of the guide telescope 20, as the guide telescope 20 moves and induces differential flexure or vector B, the guide telescope 20 invariantly maintains the internal reticle 28 at a centered orientation with respect to the camera fiducials 36, ignorant, as it were, of the differential flexure vector B. In other words, the guide telescope operates in a perfect registration to a guide star, but the main telescope 12 is therefore now out of registration, by an amount equal to the differential flexure vector B. Restated, in terms of the FIG. 3 vector diagram, the problem is that the total appropriate correction should be (−A), not (−C). Accordingly, a final image recorded by the main telescope 12 may show an unacceptable image smear, of amount (−B).

I have now invented an optical reticle projector that is suitable for employment in astronomical data collection. An important advantage of the novel optical reticle projector is that its use addresses and accommodates the problem of differential flexure, thereby solving the problem. The novel optical reticle projector consists of:
 a) a housing;
 b) a source of radiation secured by the housing, the source of radiation capable of outputting a radiation beam along an optical axis defined with respect to the housing;
 c) an optical field element secured by the housing and positioned on the optical axis;
 d) a reticle having a predetermined geometry, and in operative association with the field element; and,
 e) an imaging lens secured by the housing, positioned on the optical axis, and capable of imaging the reticle to infinity.

BRIEF DESCRIPTION OF THE DRAWING

The invention is illustrated in the accompanying drawing, in which.

DETAILED DESCRIPTION OF THE INVENTION

Figure 4:
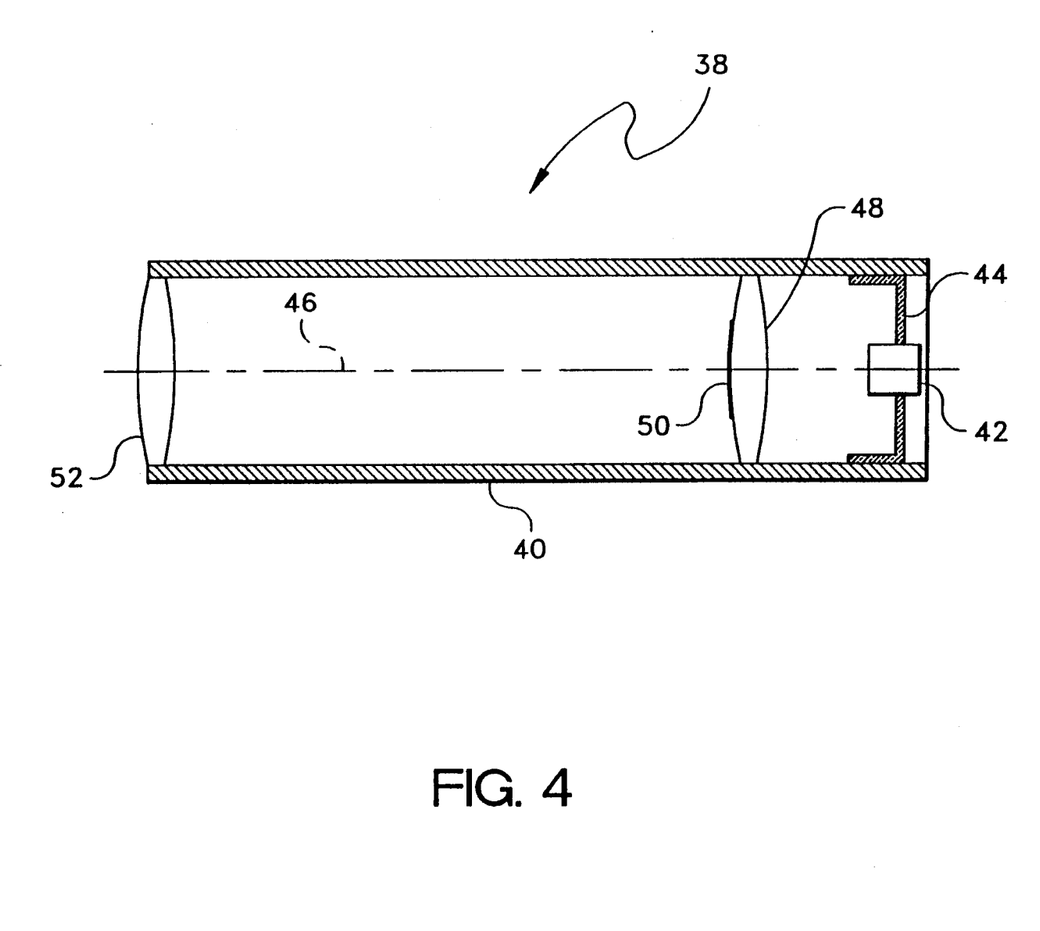
FIG. 4 shows a novel optical reticle projector of the present invention.

I summarize above a novel optical reticle projector suitable for use in a ground-based optical system. A preferred optical reticle projector 38 is shown in FIG. 4. Preferred components of the optical reticle projector 38 are first disclosed, followed by a recital of its operation in a ground-based optical system.

The optical reticle projector 38 preferably comprises a cylindrical housing 40. The cylindrical housing preferably has a radius from 0.5 to 4.0 inches (1.3 to 10.2 cm), with a radius of 1.0 inches (2.5 cm) being especially preferred. The housing 40 preferably comprises a rigid tube, and preferably comprises aluminum, Invar or steel. The weight of the housing 40 is preferably as small as possible, without compromising a desired rigidity. For example, the housing 40 is preferably less than 5.0 pounds, particularly less than 3.0 pounds. A small weight is preferred, not only in and of itself, for ease in operation and compactness, but also to maximize a relative weight proportionality between the optical reticle projector 38 and a guide telescope. This last fact has an important functional counterpart: a maximized relative weight proportionality between the optical reticle projector 38 and the guide telescope functions to minimize the problem of differential flexure.

The optical reticle projector 38 includes a source of radiation 42 that it secured to the housing 40 by conventional means, for example, lightweight brackets 44. The source of radiation 42 outputs a radiation beam along an optical axis 46 that preferably is parallel to the housing 40. A preferred source of radiation 42 comprises a conventional LED (light emitting diode).

The optical reticle projector 38 further includes an optical field element 48 conventionally secured by the housing 40, and centered on the optical axis 46. The optical field element 48 preferably comprises a condensing lens or a diffuser, for example, opal glass.

The optical field element 48 preferably secures a reticle 50. The reticle 50 preferably comprises a predetermined geometric configuration, for example, straight-line hatches, and is preferably clear on a dark surround.

Finally, the optical reticle projector 38 includes an imaging lens 52 conventionally secured by the housing 40, positioned on the optical axis 46, and capable of imaging the reticle 50 to infinity. The imaging lens 52 preferably comprises an achromatic lens that can function to collimate the radiation beam outputted from the reticle 50, for imaging at infinity.

Figure 5:
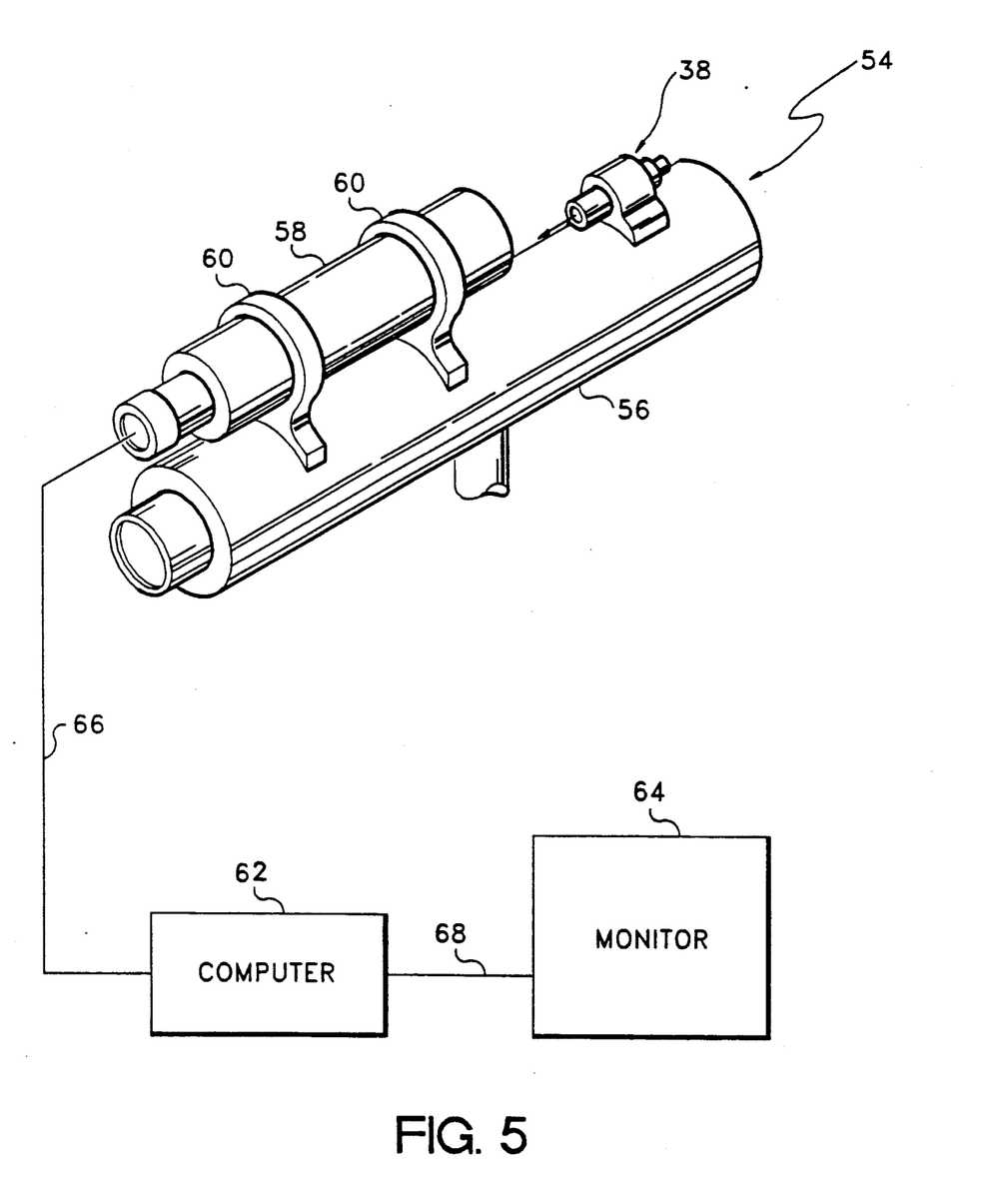
FIG. 5 shows an optical system that can employ the novel optical reticle projector.

Attention is now directed to FIG. 5, which shows a preferred optical system 54 employing the FIG. 4 optical reticle projector 38.

The optical system 54 comprises a main telescope 56, which secures the optical reticle projector 38 by conventional means, for example, a nut and bolt assembly (not shown), and a guide telescope 58 secured to the main telescope 56 by way of interface bracketry 60. The guide telescope 58 may be modified so that it does not have an internal reticle component. A conventional computer 62 and a camera monitor 64 can receive vector A signals from the guide telescope 58 and computer 62, respectively, along a set of lines 66, 68.

The operation of the FIG. 5 optical system 54 is as follows. The optical reticle projector 38 broadcasts an image of the reticle 50 into the guide telescope 58. The guide telescope camera monitor 64 detects the reticle image as sharply focused on the sky; conjugate, and in sharp focus with a guide star. The guide telescope 58, also, simultaneously, images a guide star through its (larger) objective lens. The simultaneous imagery of guide star through a larger guide telescope objective lens, and the projected reticle via the optical reticle projector 38, may be understood by reference to FIG. 6.

Figure 6:
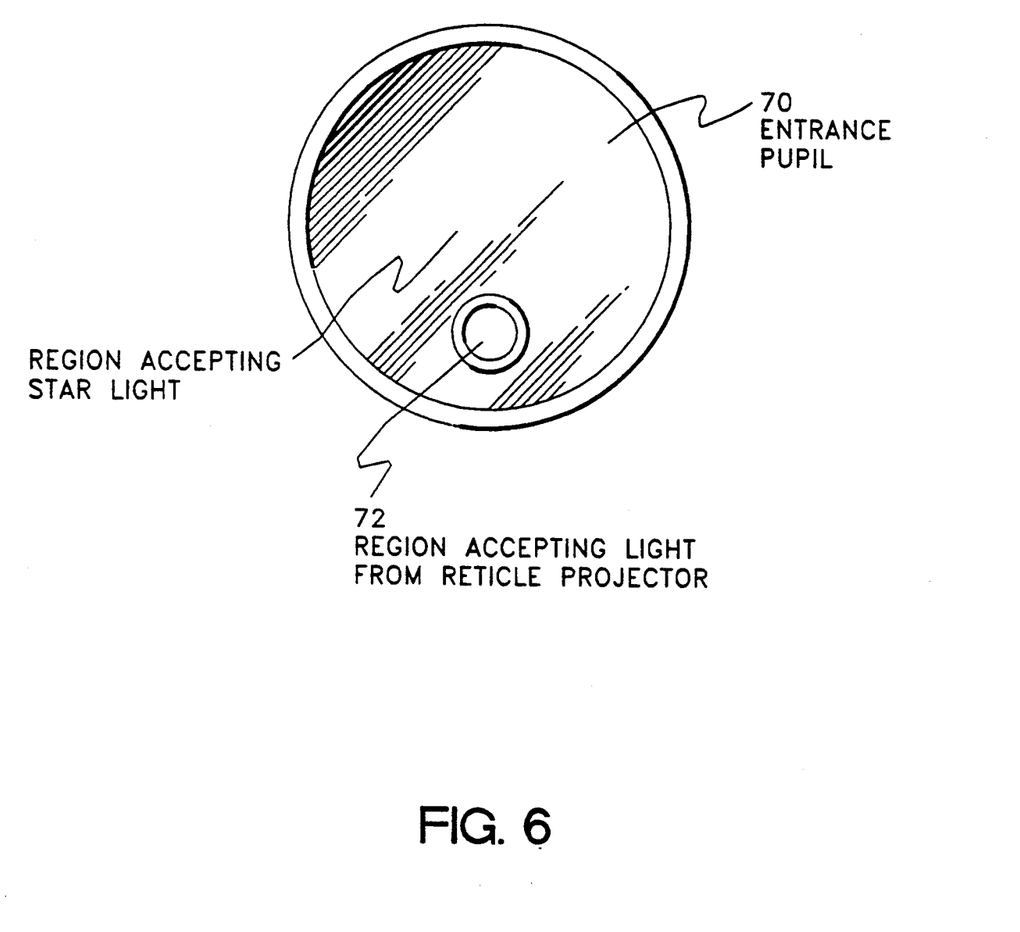
FIG. 6 shows an entrance pupil that corresponds to an interaction of the novel optical reticle projector and a guide telescope.

In FIG. 6, a large circle 70 represents an entrance pupil of the guide telescope 58. A small circle 72 shows a portion of the entrance pupil that may be used to accept the projected radiation beam from the optical reticle projector 38. Because the guide telescope 58 is focused at infinity, and because the optical reticle projector 38 projects an image of the reticle to infinity, the guide telescope camera monitor 64 can sense a sharply focused image of the reticle, nominally centered in the camera's field of view, but independent of the relative centering of the guide telescope 58 to the reticle projector 38. The remainder of the large entrance pupil 70 receives ample starlight to result in a bright image of a guide star.

In use, large or small mechanical swings or excursions of the optical system 54 result in negligible effects due to differential flexure. This point can be understood by reference to FIGS. 7A and 7B.

Figure 7A:
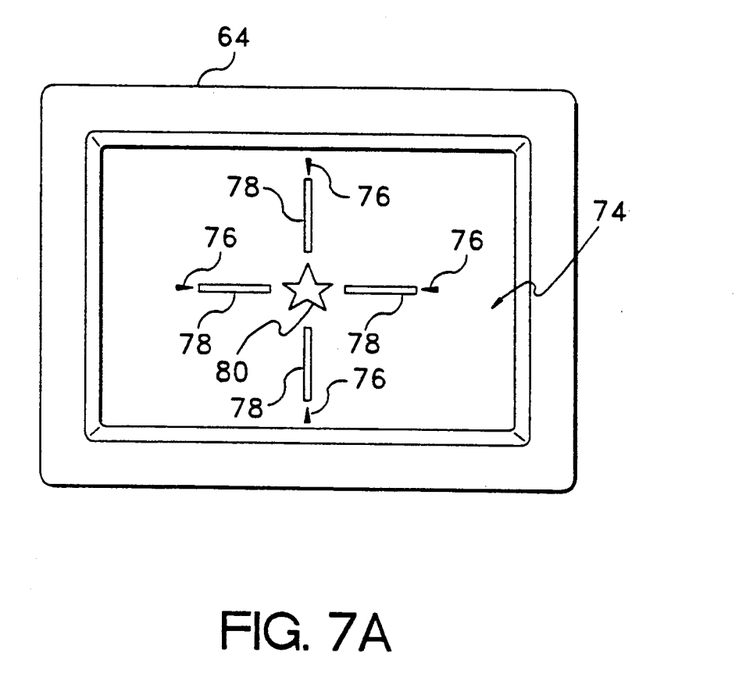
FIGS. 7A, B show views developed on a camera monitor screen, during an employment of the novel optical reticle projector.

FIG. 7A shows a camera monitor 64 display 74 at the beginning of an exposure. Note that camera fiducials 76, a projected reticle image 78, and a star image 80 are all co-centered.

Figure 7B:
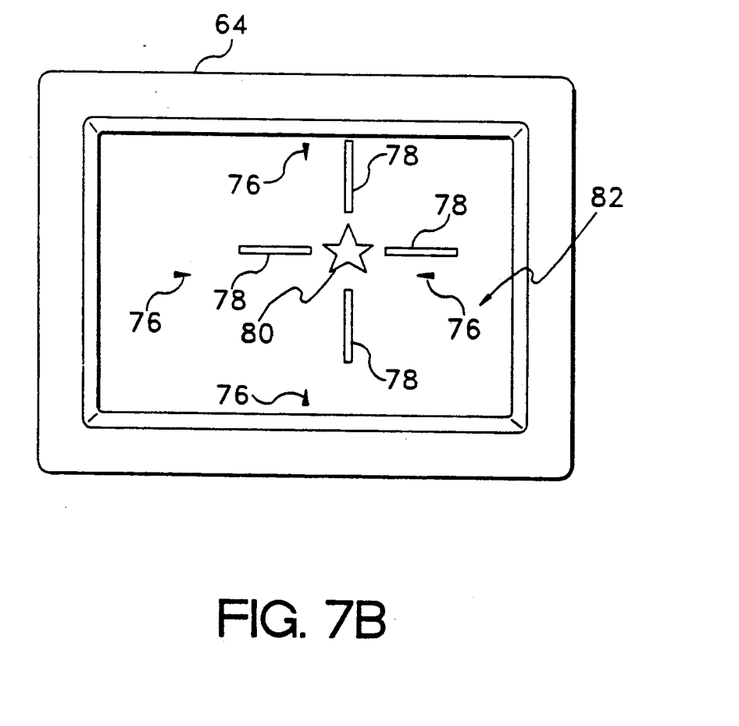

FIG. 7B shows a display 82 at the end of an exposure. An operator or the computer 62 has maintained the star image 80 on the reticle image 78 center, in response to a vector A signal, by use of guide correction motors, or by adjusting the rates of main drive motors.

However, note in particular that the reticle image 78 is no longer centered upon the camera fiducials 76. This is because the guide telescope 58 has been differentially flexed during the exposure, by an amount equal to vector B. However, because the compact and lightweight optical reticle projector 38 of the present invention has not incurred substantial differential flexure, an image from the main telescope 56 exposure is not smeared. Referring to FIG. 2, I have therefore correctly adjusted this image by an amount vector (−A), not the erroneous vector (−C).

The structure, use, and key advantages of a novel optical reticle projector have now been disclosed. Other important advantages are now noted. First, the lightweight and self-contained optical reticle projector eliminates certain difficulties heretofore attendant on the prior-art guide telescope operations. For example, the guide telescope may now be removed for cleaning and storage. Its re-installation, (or substitute such units) in an optical system, for example, that of FIG. 5, is straightforward, since the guide telescope mounting bracketry need not be as rigid as heretofore. Further, optical alignment of a re-installed guide telescope to the optical reticle projector is direct, and may be done in daylight, thus reserving valuable nighttime viewing for scientific research.

I claim:

1. A ground-based optical system for collecting data on an astronomical target of interest that moves across the sky during a period of observation, due to movement of the earth's rotation;
   a first optical component having a first aperture with a field of view aimed for acquiring an image of the target of interest;
   a second optical component having a second aperture with a field of view aimed for acquiring an image of an astronomical guide target that is different from the target of interest and that moves across the sky in correspondence with the movement of the target of interest;
   means for connecting the second optical component to the first optical component;
   means, fixedly mounted on the first optical component separate from the second optical component, for projecting an image of a reticle into a portion of the field of view of the second aperture; and
   means, responsive to changes in position of the acquired image of the guide target relative to the projected image of the reticle, for moving the first optical component to track the movement of the target of interest.

2. The ground-based optical system as in claim 1, wherein the first optical component comprises a main telescope pointed at the target of interest, the second optical component comprises a guide telescope focused at infinity and pointed at a guide target which is brighter than the target of interest; and the reticle projecting means comprises means for projecting an image of the reticle to infinity, so that the guide telescope simultaneously detects the reticle image as sharply focused in the sky, conjugate, and in sharp focus with the guide target image.

3. The ground-based optical system as in claim 2, wherein the guide telescope is connected to the main telescope by interface bracketry.

4. The ground-based optical system as in claim 2, wherein the main telescope has a given weight; the first aperture has a given diameter; the guide telescope has a weight equal to or greater than 10% of the given weight; the second aperture has a diameter equal to or greater than 30% of the given diameter; and the projecting means further comprises means having a cylindrical housing weighing less than 5% of the given weight and having a diameter less than 10% of the given diameter.

5. The ground-based optical system as in claim 2, wherein the guide target is a guide star, and the reticle projecting means comprises an optical reticle projector located between the second aperture and the guide star.

6. In a ground-based optical system for collecting data on an astronomical target of interest that moves across the sky due to the earth's rotation; the system including a first optical component having a first aperture with a field of view aimed for acquiring an image of the target of interest, a second optical component having a second aperture with a field of view aimed for acquiring an image of an astronomical guide target that is different from the target of interest and that moves across the sky in correspondence with the movement of the target of interest, means for connecting the second optical component to the first optical component and means, responsive to changes in position of the acquired image of the guide target, for moving the first optical component to track the movement of the target of interest; an improvement comprising:

the optical system further including means, fixedly mounted on the first optical component separate from the second optical component, for projecting an image of a reticle into a portion of the field of view of the second aperture; and the first optical component moving means comprising means for moving the first optical component responsive to changes in position of the acquired image of the guide target relative to the projected image of the reticle.

7. The improvement as in claim 6, wherein the first optical component comprises a main telescope pointed at the target of interest, and the second optical component comprises a guide telescope pointed at the guide target, further comprising the reticle image projecting means being an optical reticle projector, including:
   a) a housing;
   b) a source of radiation secured by the housing, the source of radiation being capable of outputting a radiation beam along an optical axis defined with respect to the housing;
   c) an optical field element secured by the housing and positioned on the optical axis;
   d) a reticle having a predetermined geometry, and being in operative association with the field element; and
   e) an imaging lens secured by the housing and being positioned on the optical axis for imaging the reticle at infinity.

8. The improvement as in claim 7, wherein the housing has a weight of less than 5.0 pounds.

9. The improvement as in claim 7, wherein the housing has a weight of less than 3.0 pounds.

10. The improvement as in claim 7, wherein the housing comprises aluminum.

11. The improvement as in claim 7, wherein the housing comprises Invar.

12. The improvement as in claim 7, wherein the source of radiation comprises a light emitting diode.

13. The improvement as in claim 7, wherein the optical field element comprises a condensing lens.

14. The improvement as in claim 7, wherein the optical field element comprises a diffuser.

15. The improvement as in claim 7, wherein the reticle comprises straight-line hatches.

16. The improvement as in claim 7, wherein the imaging lens comprises an achromatic lens.

17. A method using a ground-based optical system for collecting data on an astronomical target of interest that moves across the sky due to the earth's rotation, the method comprising the steps of:
   acquiring an image of the target of interest in a field of view of a first aperture of a main telescope;
   acquiring an image of a guide star in a field of view of a second aperture of a guide telescope connected to the main telescope;
   projecting an image of a reticle into a portion of the field of view of the second aperture using an optical reticle projector fixedly mounted on the main telescope separate from the guide telescope; and
   moving the main telescope to maintain the position of the image of the guide star in the field of view of the second aperture relative to the projected image of the reticle as seen by the guide telescope;
   whereby the main telescope tracks the movement of the astronomical target of interest to maintain the position of the target of interest in the field of view of the first aperture.

18. The method as in claim 17, wherein, in the projecting step, the image of the reticle is projected to infinity, so that the guide telescope simultaneously detects the reticle image as sharply focused on the sky, conjugate, and in sharp focus with the guide star image.

19. The method as in claim 18, wherein the moving step further comprises using a camera monitor and a computer to maintain the guide star image centered relative to the reticle image.

* * * * *